(12) United States Patent
Matzdorf et al.

(10) Patent No.: US 6,375,726 B1
(45) Date of Patent: Apr. 23, 2002

(54) CORROSION RESISTANT COATINGS FOR ALUMINUM AND ALUMINUM ALLOYS

(75) Inventors: Craig Matzdorf, California; Michael Kane, Callaway; James Green, Lusby, all of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/702,225

(22) Filed: Oct. 31, 2000

(51) Int. Cl.[7] .............................................. C23C 22/05
(52) U.S. Cl. ................. 106/14.44; 106/14.21; 106/14.41; 148/247
(58) Field of Search ................ 106/14.44, 14.21, 106/14.41; 148/247

(56) References Cited

U.S. PATENT DOCUMENTS

| | | | |
|---|---|---|---|
| 3,539,403 A | * 11/1970 | Ries | 148/243 |
| 3,912,548 A | 10/1975 | Faigen | 428/472 |
| 3,986,970 A | * 10/1976 | Shiga | 252/79.3 |
| 4,148,670 A | 4/1979 | Kelly | 148/247 |
| 4,273,592 A | 6/1981 | Kelly | 428/472.2 |
| 4,339,310 A | 7/1982 | Oda et al. | 205/199 |
| 4,921,552 A | 5/1990 | Sander et al. | 148/247 |
| 4,963,198 A | 10/1990 | Higgins | 148/267 |
| 5,091,023 A | * 2/1992 | Saeki et al. | 148/247 |
| 5,226,976 A | 7/1993 | Carlson | 148/265 |
| 5,304,257 A | 4/1994 | Pearlstein | 148/265 |
| 5,395,655 A | 3/1995 | Kazuyuki et al. | 427/388.4 |

* cited by examiner

Primary Examiner—Anthony Green
(74) Attorney, Agent, or Firm—Ron Billi

(57) ABSTRACT

This invention is for the protection and surface treatment of aluminum, aluminum alloys and coated aluminum substrates against corrosion. The aluminum substrates are treated with an acidic aqueous solution containing small but effective amounts of at least one trivalent chromium salt such as a trivalent chromium sulfate, at least one alkali metal hexafluorazirconate such as potassium hexafluorozirconate in combination with small but effective amounts of at least one water soluble or dispersible thickening agent such as a cellulose compound and at least one water soluble surfactant. The corrosion resistant aluminum substrates of this invention have improved adhesion for overlaying coatings e.g. paints and a lower electrical resistance contact.

14 Claims, No Drawings

CORROSION RESISTANT COATINGS FOR ALUMINUM AND ALUMINUM ALLOYS

ORIGIN OF THE INVENTION

The invention described herein was made by an employee of the United States Government and may be manufactured and used by or for the Government for governmental purposes without the payment of any royalties thereon or therefore.

BACKGROUND OF THE INVENTION

1. Field of the Invention

This invention relates to the protection and surface treatment and coating of metal substrates and to surface treatment and coating compositions employed as solutions or dispersions and to the method of using these compositions for the treatment of aluminum, aluminum alloys and coated aluminum substrates. The compositions coated on the metal surfaces provide improved corrosion resistance, adhesion of overlaying coatings e.g. paints, and maintains low electrical contact resistance in a corrosive environment. More specifically, this invention relates to a novel corrosion resistant composition and to the process of using the composition on aluminum, aluminum alloys and coated aluminum substrates which comprises an acidic aqueous solution containing effective amounts of at least one water soluble trivalent chromium salt, an alkali metal hexafluorozirconate, at least one water soluble thickener and water soluble surfactants.

2. Description of Prior Art

It is a current practice to improve the corrosion resistance and bonding of subsequent coatings to metal surfaces by initially coating or treating the metal surface with protective films. The coating enhances the corrosion resistance of the unpainted metal surface and prepares the surface for a finish coating such as paint. These conversion coatings are most often applied by the use of hexavalent chromium-containing solutions. While these coatings provide good corrosion resistance, attempts have been made to provide a more acceptable non-chromate derived coating because of the growing concern regarding the occupational, safety, health and environmental effects of hexavalent chromium. Hexavalent chromium is highly toxic and is a known carcinogen. Therefore, the solutions used to deposit these protective films and the films per se are toxic carcinogenic. Chromate films, however, provide outstanding paint adhesion and corrosion resistance and are easy to apply by various methods including immersion, spraying or by the wipe-on technique. Environmental laws and OSH regulations are forcing the military and commercial users to find other non-toxic non-chromate pretreatments. Moreover, the use of chromate conversion coatings is becoming more expensive as the regulations are being enforced and costs become prohibitive with the restrictions being imposed by the EPA. In addition, certain processes like spraying chromate conversion coatings are forbidden because of OSH, thereby forcing the use of less than optimum alternative methods.

More specifically, it is known that aqueous chromate solutions contain chemicals that partially dissolve the surface of the metal and form insoluble films known as chromate conversion coatings. These coatings are corrosion resistant and protect the metal from various elements which cause corrosion. Although the conversion coatings enhance corrosion resistance and improve the paint bonding properties, the coatings have a serious drawback, i.e., the toxic nature of the solutions from which they are made and the presence of hexavalent chromium in the applied films. This is a serious problem from the standpoint of the operators handling the solution e.g. disposing the used chromate solution and the chromate-contaminated rinse water, and the coating systems contaminated with chromates. These problems, however, can be avoided by eliminating the hexavalent chromium from the process. However, this method is expensive and can be a major cost factor in the overall metal treating process. Therefore it is highly desirable to provide processes and protective coatings which are free of hexavalent chromium, but at the same time capable of imparting corrosion resistant and paint bonding properties which are comparable to those imparted by conventional chromate-based conversion coatings. Of particular interest is the use of chromate conversion coatings on aluminum alloys e.g. the coating of large objects such as aircraft. It would be desirable to provide a protective coating for aluminum, its alloys and coated aluminum utilizing relatively non-toxic chemicals that could serve as an alternative to the toxic hexavalent chromium.

SUMMARY OF THE INVENTION

This invention relates to acidic aqueous trivalent chromium compositions i.e. solutions of trivalent chromium salts and to a process of preparing corrosion resistant coatings on aluminum, aluminum alloys and coated aluminum substrates which comprises treating or coating the aluminum substrates at ambient temperatures with effective amounts of the aqueous solution to form a corrosion resistant coating or film on the surface of the substrate. The acidic aqueous solutions of this invention comprise per liter of water, from about 3 to 22 grams of a water soluble basic trivalent chromium salt, and preferably from 3 to 12 grams of chromium salt e.g. 5–7 grams, about 1.5 to 11.5 grams, and preferably 3 to 9 grams e.g. 6–8 grams, of an alkali metal hexafluorozirconate, from about 0 to 10 grams e.g. from 0.5 to 2.0 grams of a water soluble thickener and from about 0 to 10 grams e.g. from 0.5 to 2.0 grams of a water soluble surfactant.

It is therefore an object of this invention to provide a solution comprising a trivalent chromium salt and an alkali metal hexafluorozirconate for preparing corrosion resistant substrates of aluminum, aluminum alloys and coated aluminum.

It is another object of this invention to provide an aqueous solution or dispersion for treating aluminum, aluminum alloys and coated aluminum which contain trivalent chromium salts to improve the corrosion resistant, paint adhesion and provide aluminum substrates with low electrical contact resistance in a corrosive environment.

It is still a further object of this invention to provide an aqueous solution comprising a water soluble trivalent chromium salt in combination with an alkali metal hexafluorozirconate, a water soluble thickener and a water soluble surfactant for preparing corrosion resistant coatings on aluminum and aluminum alloy substrates.

These and other objects will become apparent to those skilled in the art from a further and more detailed description of the invention as follows:

DETAILED DESCRIPTION OF THE INVENTION

More specifically, this invention relates to an acidic aqueous solution of a trivalent chromium salt having a pH ranging from about 2–6 e.g. 4–5 and the use thereof for preparing corrosion resistant coatings or films on aluminum, aluminum alloys and coated aluminum substrates which comprises from about 3.0 to 22 grams per liter of solution and preferably about 3 to 12 grams per liter e.g. 5–7 grams of at least one water =soluble trivalent chromium salt, about 1.5 grams to 11.5 grams and preferably about 3 to 9 grams e.g. 6–8 grams per liter of solution of at least one alkali metal hexafluorozirconate, from about 0.0 to 10 grams per liter of the solution and preferably from about 0.5 to 2.0 grams per liter of at least one water soluble or dispersible thickener e.g. water soluble organic thickener and from about 0.0 to 10 grams per liter and preferably 0.5 to 2.0 grams per liter of the solution of at least one water soluble surfactant or wetting agent selected from the group consisting of nonionic, cationic and anionic surfactants. The trivalent chromium may be added as any water-soluble trivalent chromium compound, preferably as a trivalent chromium salt. Although the resultant coating is rinsed with water, it is desirable to use salts that provide anions that are not as corrosive as the chlorides which include anions selected from the group consisting of nitrates, sulphate, phosphate and acetates.

Specifically, in formulating the aqueous coatings of this invention, the chromium can be added conveniently to the solution in its water soluble form wherein the valence of the chromium is plus 3. The preferred chromium compounds are incorporated in the solution in the form of $Cr_2(SO_4)_3$, $(NH_4)Cr(SO_4)_2$ or $KCr(SO_4)_2$ and mixtures of these compounds. The aluminum surface is either pure aluminum, an aluminum alloy or coated aluminum substrate containing over 60% aluminum. The most preferred trivalent chromium concentration is within the range of about 5 to 7 grams per liter of the aqueous solution. It has been found that particularly good results are obtained economically when the chromium is present in this preferred range. The most preferred metal fluorozirconate addition to the solution ranges from about 6 to 8 grams per liter. The treatment or coating of the aluminum surface can be carried out at various temperatures including the temperature of the solution which ranges from ambient e.g. room temperature up to about 200° F. Room temperature treatment is preferred in that this eliminates the necessity for heating equipment. The coating may be air dried by any of the methods known in the art, for example, oven drying, forced air drying, exposure to infra-red lamps, etc. For purposes of this invention, the terms aluminum and aluminum alloys include pretreated or coated substrates of aluminum and its alloys including a process known as ion vacuum deposition (IVD) where the aluminum alloy substrate is pretreated or coated e.g. with aluminum before the substrate is coated with the trivalent chromium salt solution of this invention.

The following Examples 1–3 illustrate the solutions of this invention and the method of using the solutions in preparing corrosion resistant aluminum and aluminum alloy substrates.

EXAMPLE 1

An acidic aqueous solution for treating aluminum and aluminum alloys to form a corrosion-resistant coating thereon comprises from about 6.0 grams of trivalent chromium sulfate per liter of solution, about 8.0 grams of potassium hexafluorozirconate per liter of solution and about 1.0 gram per liter of solution of a cellulose thickener and about 1.0 gram of a water soluble nonionic surfactant per liter of solution.

EXAMPLE 2

An acidic aqueous solution for treating aluminum and aluminum alloys to form a corrosion-resistant coating thereon which comprises per liter of solution from about 3.0 to 12 grams of trivalent chromium sulfate, about 3 to 9 grams of sodium hexafluorazirconate and from about 0.5 to 2.0 grams of methylcellulose thickener.

EXAMPLE 3

An acidic aqueous solution for treating aluminum and aluminum alloys to form a corrosion-resistant coating thereon which comprises, per liter of solution, from about 5.0 to 7.0 grams of a trivalent potassium-chromium sulfate $(KCr(SO4)_2)$ about 6 to 8 grams of potassium hexafluorozirconate and from about 0.5 to 2.0 grams of a methyl cellulose thickener.

Prior to forming the trivalent chromium coating (per Example 1), the aluminum substrates were treated by cleaning the substrates for about 15 minutes at temperatures ranging from about 100° to 140° F. with an alkaline phosphate cleaner, rinsed in tap water and subsequently immersed in a non-chromate deoxidizer for about 15 to 20 minutes under ambient conditions and then rinsed again in ambient tap water. The cleaned substrates were then immersed in the acidic trivalent chromium sulfate solution at ambient conditions for about 30 seconds to 60 minutes and subsequently rinsed in ambient tap water and let stand until dry. In an alternative process, the aluminum substrates were degreased by immersion in a cleaner (Turco 4215) for about 15 minutes at 120° F. then rinsed in warm tap water and again immersed in a cleaner (Turco Smut Go NC) for about 15 minutes under ambient conditions. After a further water rinse, the cleaned substrates were immersed in an acidic aqueous solution of trivalent chromium sulfate containing effective amounts of potassium hexafluorozirconate at ambient temperatures and then rinsed.

Coating the substrates with the trivalent chromium solutions of this invention can be accomplished by spraying, wiping or immersing the substrate. The duration of contact ranges from about 5 to 30 seconds, but longer contact, e.g., up to five minutes, may be required where the trivalent chromium concentration or temperature of the solution is relatively low. The aqueous solution temperature is normally below 100° C., e.g. in the range of 40° to 75° C. The metal temperature ranges from about 40° to 60° C., and often around 50° C., prior to the coating treatment. The coating is rinsed with water, dried and then painted e.g. with an epoxy primer and/or paint.

The following Examples I through V illustrate the trivalent chromium pretreatment solutions of this invention and the use thereof in coating aluminum alloys as shown in Tables C, D, E and F.

EXAMPLE (TCPI) I

A trivalent chromium pretreatment (TCP) acidic aqueous solution was prepared with about 0.6 grams per liter of solution of basic trivalent chromium sulfate and about 0.8 grams per liter of solution of potassium hexafluorozirconate.

EXAMPLE (TCP10) II

A trivalent chromium pretreatment (TCP) acidic aqueous solution was prepared with about 6.0 grams per liter of solution of basic trivalent chromium sulfate and about 8.0 grams per liter of solution of potassium hexafluorozirconate.

EXAMPLE (TCPIM4) III

A trivalent chromium pretreatment (TCP) acidic aqueous solution was prepared with about 0.6 grams per liter of solution of basic trivalent chromium sulfate, about 0.8 grams per liter of solution of potassium hexafluorozirconate and about 0.4 percent by weight of the solution of a cellulose compound (Methocel F4M).

EXAMPLE (TCP 2M4 AND TCP 10M4) IV, AND V

Examples IV and V (TCP2M4 and TCP10M4) are the same as aqueous solutions TCP1 and TCP10, respectively, except that each of these solutions also contained about 0.4 percent by weight of the aqueous solution of hydroxy methyl cellulose (Methocel F4M) as the thickener.

The pH of various trivalent chromium pretreatment (TCP) solutions over time is shown in Table E.

TABLE E

| Composition | pH on 10/28 (day mixed) | pH on 11/4 | pH on 11/10 | pH on 11/22 | pH on 12/14 |
|---|---|---|---|---|---|
| TCP1 | 3.57 | 3.93 | 3.96 | 4.01 | |
| TCP10 | 3.48 | 3.79 | 3.82 | 3.81 | 3.75 |
| TCP1m4 | 3.55 | 3.94 | 3.97 | 3.97 | |
| TCP2M4 | 3.41 | 3.93 | 3.95 | 3.93 | |
| TCP10M4 | 3.23 | 3.78 | 3.82 | 3.79 | 3.75 |

The testing of bare corrosion of the trivalent chromium pretreatment is shown in Table F.

TABLE F

| Composition | Day 1 | Day 2 | Day 6 | Day 14 |
|---|---|---|---|---|
| TCP1 | 5 | 4 | 4 | 0 |
| TCP10 | 10 | 10 | 10 | 9 |
| TCP1M4 | 7 | 6 | 5 | 3 |
| TCP2M4 | 9 | 8 | 7 | 6 |
| TCP10M4 | 10 | 10 | 10 | 9 |

The coated aluminum alloy (2024-T3) samples were placed in a neutral salt fog (per ASTM-B-117) for about 336 hours at 60° C. The corrosion ratings of the coated samples were based on the ASTM-D1654 test wherein the coated samples were rated from 0 to 10 with 10 representing the best performance.

The necessity of using a thickener in the trivalent chromium pretreatment solutions of this invention is illustrated in the Examples shown in Table C and Table D. In Table C, the aluminum alloy coupons were treated with the solution of Example I (TCP-1) which did not contain the thickener. Table C shows that the average coating weight is about 24.65 mg/ft$^2$. In comparison, the data in Table D shows that where the thickener (Methocel F4M) was used in the solution (Example III-TCP1M4), the average coating weight was 28.56 mg/ft$^2$. Thus, in comparing the data of Table C with Table D, it was found that the chromium pretreatment solution (Example III-TCP1M4) containing the thickener (Methocel F4M) resulted in coatings on the aluminum alloy to be about 16% heavier.

TABLE C

| Coupon ID | Alloy of Aluminum | Coating Weight (mg/ft2) |
|---|---|---|
| 6A | 6061-T6 | 23.04 |
| 6B | 6061-T6 | 25.95 |
| 2A | 2024-T3 | 24.96 |
| 2B | 2024-T3 | 25.95 |

Average CW: 24.65

TABLE D

| Coupon ID | Alloy of Aluminum | Coating Weight (mg/ft2) |
|---|---|---|
| 6A | 6061-T6 | 27.84 |
| 6B | 6061-T6 | 28.80 |
| 2A | 2024-T3 | 27.84 |
| 2B | 2024-T3 | 29.76 |

Average CW: 28.56

The panels of aluminum no's. 7–1 through 7–108 in Table G show the aluminum coupons (7075–T6) treated with an aqueous trivalent chromium solution (TCP-10/M2) to provide paint adhesion data on various aluminum substrates using Milspec paints. The paint adhesion data was obtained by using modified test (AST D-3359 Method A). The columns 2–5 of Table G identify various paints including SPT as a self-priming topcoat (TT-P-27561), 23377 as a chromated high solids epoxy primer, 85582 as chromated waterborne epoxy primer, and 85582N as a non-chromated waterborne epoxy primer.

Column 6 of Table G shows the wet tape adhesion test performed 1, 4 and 7 days immersed in water followed by scribing and tape pulling. Column 7 of Table G shows the method of applying solutions of the chromium pretreatment including "S" for spraying, "W" for wipe and "I" for immersion of the aluminum coupons. Column 8 of Table G shows the paint adhesion rating for each coupon (ASTMD-33) with 5A being the best and column 9 shows the blistering rate for the paint systems (ASTMD-714).

TABLE G

Examples 7-1 through 7-53
Columns 2–9

| 7075-TB Panel | 2 SPT | 3 23377 | 4 85582 | 5 85582N | 6 Test | 7 Pretreat | 8 Adhesion Rating | 9 Blistering |
|---|---|---|---|---|---|---|---|---|
| 7-1 | X | | | | 1D WTA | Accelagold-S | 4A | none |
| 7-2 | X | | | | 4D WTA | Accelagold-S | 5A | none |
| 7-3 | X | | | | 7D WTA | Accelagold-S | 5A | none |
| 7-4 | | X | | | 1D WTA | Accelagold-S | 5A | none |
| 7-5 | | X | | | 4D WTA | Accelagold-S | 5A | none |
| 7-6 | | X | | | 7D WTA | Accelagold-S | 5A | none |

TABLE G-continued

Examples 7-1 through 7-53
Columns 2–9

| 7075-TB Panel | 2 SPT | 3 23377 | 4 85582 | 5 85582N | 6 Test | 7 Pretreat | 8 Adhesion Rating | 9 Blistering |
|---|---|---|---|---|---|---|---|---|
| 7-7 | | | X | | 1D WTA | Accelagold-S | 5A | none |
| 7-8 | | | X | | 4D WTA | Accelagold-S | 5A | none |
| 7-9 | | | X | | 7D WTA | Accelagold-S | 5A | none |
| 7-10 | | | | X | 1D WTA | Accelagold-S | 5A | none |
| 7-11 | | | | X | 4D WTA | Accelagold-S | 5A | none |
| 7-12 | | | | X | 7D WTA | Accelagold-S | 5A | none |
| 7-13 | X | | | | 1D WTA | Alodine 1200S-W | 4A | none |
| 7-14 | X | | | | 4D WTA | Alodine 1200S-W | 4A | ~50 #8#10 blisters at random spots and edges |
| 7-15 | X | | | | 7D WTA | Alodine 1200S-W | 4A | ~50 #6#8 blisters on one half of coupon and along edges |
| 7-16 | | X | | | 1D WTA | Alodine 1200S-W | 5A | none |
| 7-17 | | X | | | 4D WTA | Alodine 1200S-W | 5A | ~15 #8#10 blisters in one corner |
| 7-18 | | X | | | 7D WTA | Alodine 1200S-W | 5A | none |
| 7-19 | | | X | | 1D WTA | Alodine 1200S-W | 5A | none |
| 7-20 | | | X | | 4D WTA | Alodine 1200S-W | 5A | none |
| 7-21 | | | X | | 7D WTA | Alodine 1200S-W | 5A | none |
| 7-22 | | | | X | 1D WTA | Alodine 1200S-W | 5A | none |
| 7-23 | | | | X | 4D WTA | Alodine 1200S-W | 5A | none |
| 7-24 | | | | X | 7D WTA | Alodine 1200S-W | 5A | none |
| 7-25 | X | | | | 1D WTA | Alodine 1200S-I | 4A | none |
| 7-26 | X | | | | 4D WTA | Alodine 1200S-I | 5A | none |
| 7-27 | X | | | | 7D WTA | Alodine 1200S-I | 5A | none |
| 7-28 | | X | | | 1D WTA | Alodine 1200S-I | 5A | none |
| 7-29 | | X | | | 4D WTA | Alodine 1200S-I | 5A | none |
| 7-30 | | X | | | 7D WTA | Alodine 1200S-I | 5A | none |
| 7-31 | | | X | | 1D WTA | Alodine 1200S-I | 5A | none |
| 7-32 | | | X | | 4D WTA | Alodine 1200S-I | 5A | none |
| 7-33 | | | X | | 7D WTA | Alodine 1200S-I | 5A | none |
| 7-34 | | | | X | 1D WTA | Alodine 1200S-I | 5A | none |
| 7-35 | | | | X | 4D WTA | Alodine 1200S-I | 5A | none |
| 7-36 | | | | X | 7D WTA | Alodine 1200S-I | 5A | none |
| 7-37 | X | | | | 1D WTA | TCP10-W | 4A | none |
| 7-38 | X | | | | 4D WTA | TCP10-W | 5A | none |
| 7-39 | X | | | | 7D WTA | TCP10-W | 4A | none |
| 7-40 | | X | | | 1D WTA | TCP10-W | 5A | none |
| 7-41 | | X | | | 4D WTA | TCP10-W | 5A | none |
| 7-42 | | X | | | 7D WTA | TCP10-W | 5A | few random #10 blisters |
| 7-43 | | | X | | 1D WTA | TCP10-W | 5A | none |
| 7-44 | | | X | | 4D WTA | TCP10-W | 5A | none |
| 7-45 | | | X | | 7D WTA | TCP10-W | 5A | none |
| 7-46 | | | | X | 1D WTA | TCP10-W | 5A | none |
| 7-47 | | | | X | 4D WTA | TCP10-W | 5A | none |
| 7-48 | | | | X | 7D WTA | TCP10-W | 5A | none |
| 7-49 | X | | | | 1D WTA | TCP10-S | 4A | none |
| 7-50 | X | | | | 4D WTA | TCP10-S | 5A | none |
| 7-51 | X | | | | 7D WTA | TCP10-S | 5A | none |
| 7-52 | | X | | | 1D WTA | TCP10-S | 5A | none |
| 7-53 | | X | | | 4D WTA | TCP10-S | 5A | none |
| 7-54 | | X | | | 7D WTA | TCP10-S | 5A | none |
| 7-55 | | | X | | 1D WTA | TCP10-S | 5A | none |
| 7-56 | | | X | | 4D WTA | TCP10-S | 5A | none |
| 7-57 | | | X | | 7D WTA | TCP10-S | 5A | none |
| 7-58 | | | | X | 1D WTA | TCP10-S | 5A | none |
| 7-59 | | | | X | 4D WTA | TCP10-S | 5A | none |
| 7-60 | | | | X | 7D WTA | TCP10-S | 5A | none |
| 7-61 | X | | | | 1D WTA | TCP10-I | 4A | none |
| 7-62 | X | | | | 4D WTA | TCP10-I | 5A | none |
| 7-63 | X | | | | 7D WTA | TCP10-I | 4A | none |
| 7-64 | | X | | | 1D WTA | TCP10-I | 5A | none |
| 7-65 | | X | | | 4D WTA | TCP10-I | 5A | ~15 #8 blisters along one edge |
| 7-66 | | X | | | 7D WTA | TCP10-I | 5A | none |
| 7-67 | | | X | | 1D WTA | TCP10-I | 5A | none |
| 7-68 | | | X | | 4D WTA | TCP10-I | 5A | none |
| 7-69 | | | X | | 7D WTA | TCP10-I | 5A | none |
| 7-70 | | | | X | 1D WTA | TCP10-I | 5A | none |
| 7-71 | | | | X | 4D WTA | TCP10-I | 5A | none |
| 7-72 | | | | X | 7D WTA | TCP10-I | 5A | none |
| 7-73 | X | | | | 1D WTA | TCP10M2-W | 0A | none |
| 7-74 | X | | | | 4D WTA | TCP10M2-W | 5A | ~15 #8 blisters in two small areas |
| 7-75 | X | | | | 7D WTA | TCP10M2-W | 5A | ~50 #8#10 blisters in streaks on coupon ends |
| 7-76 | | X | | | 1D WTA | TCP10M2-W | 2A | none |
| 7-77 | | X | | | 4D WTA | TCP10M2-W | 4A | streaks of #8#10 blisters on ~10% of panel |
| 7-78 | | X | | | 7D WTA | TCP10M2-W | 3A | streaks of #8#10 blisters on ~75% of panel |

TABLE G-continued

Examples 7-1 through 7-53
Columns 2–9

| 7075-TB Panel | 2 SPT | 3 23377 | 4 85582 | 5 85582N | 6 Test | 7 Pretreat | 8 Adhesion Rating | 9 Blistering |
|---|---|---|---|---|---|---|---|---|
| 7-79 | | | X | | 1D WTA | TCP10M2-W | 5A | none |
| 7-80 | | | X | | 4D WTA | TCP10M2-W | 5A | none |
| 7-81 | | | X | | 7D WTA | TCP10M2-W | 5A | none |
| 7-82 | | | | X | 1D WTA | TCP10M2-W | 5A | none |
| 7-83 | | | | X | 4D WTA | TCP10M2-W | 5A | none |
| 7-84 | | | | X | 7D WTA | TCP10M2-W | 5A | none |
| 7-85 | X | | | | 1D WTA | TCP10M2-S | 4A | none |
| 7-86 | X | | | | 4D WTA | TCP10M2-S | 4A | none |
| 7-87 | X | | | | 7D WTA | TCP10M2-S | 4A | none |
| 7-88 | | X | | | 1D WTA | TCP10M2-S | 5A | none |
| 7-89 | | X | | | 4D WTA | TCP10M2-S | 5A | row of #10 blisters along one edge (streak) |
| 7-90 | | X | | | 7D WTA | TCP10M2-S | 5A | none |
| 7-91 | | | X | | 1D WTA | TCP10M2-S | 5A | none |
| 7-92 | | | X | | 4D WTA | TCP10M2-S | 5A | none |
| 7-93 | | | X | | 7D WTA | TCP10M2-S | 5A | none |
| 7-94 | | | | X | 1D WTA | TCP10M2-S | 5A | none |
| 7-95 | | | | X | 4D WTA | TCP10M2-S | 5A | none |
| 7-96 | | | | X | 7D WTA | TCP10M2-S | 5A | none |
| 7-97 | X | | | | 1D WTA | TCP10M2-I | 4A | none |
| 7-98 | X | | | | 4D WTA | TCP10M2-I | 5A | none |
| 7-99 | X | | | | 7D WTA | TCP10M2-I | 4A | none |
| 7-100 | | X | | | 1D WTA | TCP10M2-I | 3A | none |
| 7-101 | | X | | | 4D WTA | TCP10M2-I | 3A | line of #10 blisters along center of coupon and edge |
| 7-102 | | X | | | 7D WTA | TCP10M2-I | 3A | none |
| 7-103 | | | X | | 1D WTA | TCP10M2-I | 5A | none |
| 7-104 | | | X | | 4D WTA | TCP10M2-I | 5A | none |
| 7-105 | | | X | | 7D WTA | TCP10M2-I | 5A | none |
| 7-106 | | | | X | 1D WTA | TCP10M2-I | 5A | none |
| 7-107 | | | | X | 4D WTA | TCP10M2-I | 5A | none |
| 7-108 | | | | X | 7D WTA | TCP10M2-I | 5A | none |

The data in Table H shows aluminum coupons (7075-T6) treated with the trivalent chromium pretreatment (TCP-10M2) of this invention.

TABLE H

Examples 7-1 through 7-37

| 7075-TB Panel | 1 SPT | 2 23377 | 3 85582 | 4 85582N | 5 Test | 6 Pretreat | 7 Results |
|---|---|---|---|---|---|---|---|
| 7-1 | X | | | | 2000 hr nsf | Accelagold-S | 10 (s.c.), 10, 10 |
| 7-2 | X | | | | 2000 hr nsf | Accelagold-S | 10 (s.c.), 10, 10 |
| 7-3 | X | | | | 2000 hr nsf | Accelagold-S | 10 (s.c.), 10, 10 |
| 7-4 | X | | | | 2000 hr nsf | Accelagold-S | 10 (s.c.), 10, 10 |
| 7-5 | X | | | | 2000 hr nsf | Accelagold-S | 10 (s.c.), 10, 10 |
| 7-6 | X | | | | 500 hr SO$_2$ | Accelagold-S | 5, 10, 10 |
| 7-7 | X | | | | 500 hr SO$_2$ | Accelagold-S | 5, 10, 10 |
| 7-8 | X | | | | 500 hr SO$_2$ | Accelagold-S | 5, 10, 10 |
| 7-9 | X | | | | 500 hr SO$_2$ | Accelagold-S | 5, 10, 10 |
| 7-10 | X | | | | 500 hr SO$_2$ | Accelagold-S | 5, 10, 10 |
| 7-11 | | X | | | 2000 hr nsf | Accelagold-S | 10 (n.e.c.), 10, 10 |
| 7-12 | | X | | | 2000 hr nsf | Accelagold-S | 10 (n.e.c.), 10, 10 |
| 7-13 | | X | | | 2000 hr nsf | Accelagold-S | 10 (n.e.c.), 10, 10 |
| 7-14 | | X | | | 2000 hr nsf | Accelagold-S | 10 (n.e.c.), 10, 10 |
| 7-15 | | X | | | 2000 hr nsf | Accelagold-S | 10 (n.e.c.), 10, 10 |
| 7-16 | | X | | | 500 hr SO$_2$ | Accelagold-S | NA |
| 7-17 | | X | | | 500 hr SO$_2$ | Accelagold-S | NA |
| 7-18 | | X | | | 500 hr SO$_2$ | Accelagold-S | NA |
| 7-19 | | X | | | 500 hr SO$_2$ | Accelagold-S | NA |
| 7-20 | | X | | | 500 hr SO$_2$ | Accelagold-S | NA |
| 7-21 | | | X | | 2000 hr nsf | Accelagold-S | 10 (n.e.c.), 10, 10 |
| 7-22 | | | X | | 2000 hr nsf | Accelagold-S | 10 (s.c.), 10, 10 |
| 7-23 | | | X | | 2000 hr nsf | Accelagold-S | 10 (s.c.), 10, 10 |
| 7-24 | | | X | | 2000 hr nsf | Accelagold-S | 10 (n.e.c.), 10, 10 |
| 7-25 | | | X | | 2000 hr nsf | Accelagold-S | 10 (n.e.c.), 10, 10 |
| 7-26 | | | X | | 500 hr SO$_2$ | Accelagold-S | NA |
| 7-27 | | | X | | 500 hr SO$_2$ | Accelagold-S | NA |

TABLE H-continued

Examples 7-1 through 7-37

| 7075-TB Panel | 1 SPT | 2 23377 | 3 85582 | 4 85582N | 5 Test | 6 Pretreat | 7 Results |
|---|---|---|---|---|---|---|---|
| 7-28 | | | X | | 500 hr SO$_2$ | Accelagold-S | NA |
| 7-29 | | | X | | 500 hr SO$_2$ | Accelagold-S | NA |
| 7-30 | | | X | | 500 hr SO$_2$ | Accelagold-S | NA |
| 7-31 | | | | X | 2000 hr nsf | Accelagold-S | 10 (s.c.), 10, 10 |
| 7-32 | | | | X | 2000 hr nsf | Accelagold-S | 10 (s.c.), 10, 10 |
| 7-33 | | | | X | 2000 hr nsf | Accelagold-S | 10 (s.c.), 10, 10 |
| 7-34 | | | | X | 2000 hr nsf | Accelagold-S | 10 (s.c.), 10, 10 |
| 7-35 | | | | X | 2000 hr nsf | Accelagold-S | 10 (s.c.), 10, 10 |
| 7-36 | | | | X | 500 hr SO$_2$ | Accelagold-S | NA |
| 7-37 | | | | X | 500 hr SO$_2$ | Accelagold-S | NA |
| 7-38 | | | | X | 500 hr SO$_2$ | Accelagold-S | NA |
| 7-39 | | | | X | 500 hr SO$_2$ | Accelagold-S | NA |
| 7-40 | | | | X | 500 hr SO$_2$ | Accelagold-S | NA |
| 7-41 | X | | | | 2000 hr nsf | TCP10M2-S | 10 (50% n.e.c.), 10, 10 |
| 7-42 | X | | | | 2000 hr nsf | TCP10M2-S | 10 (50% n.e.c.), 10, 10 |
| 7-43 | X | | | | 2000 hr nsf | TCP10M2-S | 10 (50% n.e.c.), 10, 10 |
| 7-44 | X | | | | 2000 hr nsf | TCP10M2-S | 10 (50% n.e.c.), 10, 10 |
| 7-45 | X | | | | 2000 hr nsf | TCP10M2-S | 10 (50% n.e.c.), 10, 10 |
| 7-46 | X | | | | 500 hr SO$_2$ | TCP10M2-S | 4, 10, 10 |
| 7-47 | X | | | | 500 hr SO$_2$ | TCP10M2-S | 4, 10, 10 |
| 7-48 | X | | | | 500 hr SO$_2$ | TCP10M2-S | 4, 10, 10 |
| 7-49 | X | | | | 500 hr SO$_2$ | TCP10M2-S | 4, 10, 10 |
| 7-50 | X | | | | 500 hr SO$_2$ | TCP10M2-S | 4, 10, 10 |
| 7-51 | | X | | | 2000 hr nsf | TCP10M2-S | 10 (n.e.c.), 10, 10 |
| 7-52 | | X | | | 2000 hr nsf | TCP10M2-S | 10 (n.e.c.), 10, 10 |
| 7-53 | | X | | | 2000 hr nsf | TCP10M2-S | 10 (n.e.c.), 10, 10 |
| 7-54 | | X | | | 2000 hr nsf | TCP10M2-S | 10 (n.e.c.), 10, 10 |
| 7-55 | | X | | | 2000 hr nsf | TCP10M2-S | 10 (n.e.c.), 10, 10 |
| 7-56 | | X | | | 500 hr SO$_2$ | TCP10M2-S | NA |
| 7-57 | | X | | | 500 hr SO$_2$ | TCP10M2-S | NA |
| 7-58 | | X | | | 500 hr SO$_2$ | TCP10M2-S | NA |
| 7-59 | | X | | | 500 hr SO$_2$ | TCP10M2-S | NA |
| 7-60 | | X | | | 500 hr SO$_2$ | TCP10M2-S | NA |
| 7-61 | | | X | | 2000 hr nsf | TCP10M2-S | 10 (n.e.c.), 10, 10 |
| 7-62 | | | X | | 2000 hr nsf | TCP10M2-S | 10 (n.e.c.), 10, 10 |
| 7-63 | | | X | | 2000 hr nsf | TCP10M2-S | 10 (n.e.c.), 10, 10 |
| 7-64 | | | X | | 2000 hr nsf | TCP10M2-S | 10 (s.c.), 10, 10 |
| 7-65 | | | X | | 2000 hr nsf | TCP10M2-S | 10 (s.c.), 10, 10 |
| 7-66 | | | X | | 500 hr SO$_2$ | TCP10M2-S | NA |
| 7-67 | | | X | | 500 hr SO$_2$ | TCP10M2-S | NA |
| 7-68 | | | X | | 500 hr SO$_2$ | TCP10M2-S | NA |
| 7-69 | | | X | | 500 hr SO$_2$ | TCP10M2-S | NA |
| 7-70 | | | X | | 500 hr SO$_2$ | TCP10M2-S | NA |
| 7-71 | | | | X | 2000 hr nsf | TCP10M2-S | 10 (s.c.), 10, 10 |
| 7-72 | | | | X | 2000 hr nsf | TCP10M2-S | 10 (s.c.), 10, 10 |
| 7-73 | | | | X | 2000 hr nsf | TCP10M2-S | 10 (s.c.), 10, 10 |
| 7-74 | | | | X | 2000 hr nsf | TCP10M2-S | 10 (s.c.), 10, 10 |
| 7-75 | | | | X | 2000 hr nsf | TCP10M2-S | 10 (s.c.), 10, 10 |
| 7-76 | | | | X | 500 hr SO$_2$ | TCP10M2-S | NA |
| 7-77 | | | | X | 500 hr SO$_2$ | TCP10M2-S | NA |
| 7-78 | | | | X | 500 hr SO$_2$ | TCP10M2-S | NA |
| 7-79 | | | | X | 500 hr SO$_2$ | TCP10M2-S | NA |
| 7-80 | | | | X | 500 hr SO$_2$ | TCP10M2-S | NA |

In the Examples (7-1 to 7-80) of Table H, columns 1–4 identify the paints including SPT as a self-priming top coat, 23377 as a chromated high-solids epoxy primer, 85582 as a chromated waterborne epoxy primer, and 85582N as a non-chromated waterborne epoxy primer. Column 5 shows a 500 and 2000 hour test in a neutral salt fog, with the chromium pretreatments (Column 6 —Accelagold and TCP10M2-S) of this invention. Column 7 shows the results of the corrosion test where the first rating is scribed, the second is unscribed areas, and the third rating is blistering wherein all the ratings range from 1 to 10 with 10 representing the highest or best performance with regard to corrosion. In Table H, the terms N.E.C. indicates no evidence of corrosion and S.C. indicates surface corrosion in the scribe, but no undercutting.

For purposes of this invention, the water soluble surfactants are used in amounts ranging from about 0.0 to about 10 grams per liter and preferably about 0.5 to 2.0 grams per liter of trivalent chromium solution. The surfactants are added to the aqueous composition to provide better wetting properties by lowering the surface tension thereby insuring complete coverage and a more uniform coating on the substrate. The surfactants include at least one water soluble compound selected from the group consisting of the non-ionic, anionic, and cationic surfactants. The water soluble surfactants include the monocarboxyl imidoazoline, alkyl sulfate sodium salts (DUPONOL®, tridecyloxy poly(alkyleneoxy ethanol), ethoxylated or propoxylated alkyl phenol (IGEPAL®), alkyl sulfoamides, alkaryl sulfonates, palmitic alkanol amides (CENTROL®), octylphenyl polyethoxy ethanol (TRITON®), sorbitan monopalmitate (SPAN®), dodecylphenyl polyethylene glycol ether (e.g. TERGITROL®), alkyl pyrrolidone, polyalkoxylated fatty acid esters, alkylbenzene sulfonates and mixtures thereof. Other known water soluble surfactants are disclosed by "Surfactants and Detersive Systems", published by John Wiley & Sons in Kirk-Othmer's Encyclopedia of Chemical Technology, $3^{rd}$ Ed.

Where large surfaces or substrates do not permit immersion or where vertical surfaces are to be sprayed, thickening agents are used to retain the aqueous composition on the surface for sufficient contact time. The thickeners employed are known water soluble or dispersible thickeners which can be added to the trivalent chromium solution of this invention in amounts ranging from about 0.0 and about 10 grams per liter and preferably from about 0.5 to 2.0 grams per liter of the chromate solution. Specific examples of these additives include the cellulose thickeners e.g. hydroxypropyl cellulose (e.g. Klucel), ethyl cellulose, hydroxyethyl cellulose, hydroxymethyl cellulose, methyl cellulose, and some of the water soluble inorganic thickeners such as colloidal silica, clays such as bentonite, starches, colloidal alumina, gum arabic, tragacanth, agar and any combination thereof.

While this invention has been described by a number of specific examples, it is obvious that there are other variations and modifications which can be made without departing from the spirit and scope of the invention as particularly set forth in the appended claims.

The Invention claimed:

1. A process of preparing a corrosion resistant coating on aluminum, aluminum alloys and coated aluminum substrates which comprises treating said substrates at ambient temperatures with an acidic aqueous solution having a pH ranging from about 2–6 comprising, per liter of solution, from about 3.0 grams to 22 grams of a water soluble trivalent chromium salt, about 1.5 grams to 11.5 grams of an alkali metal hexafluorozirconate, from 0 to 10 grams of at least one water soluble thickener and from 0 to 10 grams of at least one water soluble surfactant selected from the group consisting of non-ionic, anionic and cationic surfactants.

2. The process of claim 1 wherein the trivalent chromium salt is trivalent chromium sulfate.

3. A The process of claim 2 wherein the alkali metal zirconate is potassium hexafluorozirconate.

4. The process of claim 3 wherein the thickener ranges from about 0.5 to 2.0 grams per liter of the aqueous solution and the surfactant ranges from about 0.5 to 2.0 grams per liter of the aqueous solution.

5. The process of claim 2 wherein the trivalent chromium sulfate ranges from about 3.0 to 12 grams per liter of aqueous solution and the alkali metal hexafluorozirconate ranges from about 3.0 to 9 grams per liter of the aqueous solution.

6. The process of claim 2 wherein the alkali metal zirconate is sodium hexafluorozirconate.

7. The process of claim 1 wherein the acidic aqueous solution has a pH ranging from about 3 to 4.

8. An acidic aqueous solution having a pH ranging from about 2–6 for preparing corrosion-resistant coatings on aluminum and aluminum alloys which comprises, per liter of solution, from about 3.0 grams to 22 grams of a water soluble trivalent chromium sulfate, about 1.5 grams to 11.5 grams of an alkali metal hexafluorozirconate, from 0.5 to 2.0 grams of at least one water soluble thickener and from 0.5 to 2.0 grams of at least one water soluble nonionic surfactant.

9. The acidic aqueous solution of claim 8 wherein the trivalent chromium sulfate ranges from about 3.0 to 12 grams per liter of the aqueous solution and the alkalimetal zirconate is potassium hexafluorozirconate ranging from about 3.0 to 9 grams per liter of the solution.

10. An acidic aqueous solution having a pH ranging from about 2–6 for preparing corrosion-resistant coatings on aluminum, aluminum alloys and coated aluminum substrates consisting essentially of, per liter of solution, from about 3.0 grams to 22 grams of a water soluble trivalent chromium salt, about 1.5 grams to 11.5 grams of an alkali metal hexafluorozirconate, from 0 to 10 grams of at least one water soluble thickener and from 0 to 10 grams of at least one water soluble surfactant selected from the group consisting of nonionic, anionic and cationic surfactants.

11. The acidic aqueous solution of claim 10 wherein the alkali metal zirconate is potassium hexafluorozirconate.

12. The acidic aqueous solution of claim 10 wherein the alkali metal zirconate is sodium hexafluorozirconate.

13. The acidic aqueous solution of claim 10 wherein the water soluble thickener is a cellulose compound.

14. The acidic aqueous solution of claim 10 wherein the water soluble surfactant is a nonionic surfactant.

* * * * *